C. W. KIRBY.
GRAVE FILLING MACHINE.
APPLICATION FILED JULY 18, 1914.
1,123,891.
Patented Jan. 5, 1915.
2 SHEETS—SHEET 1.
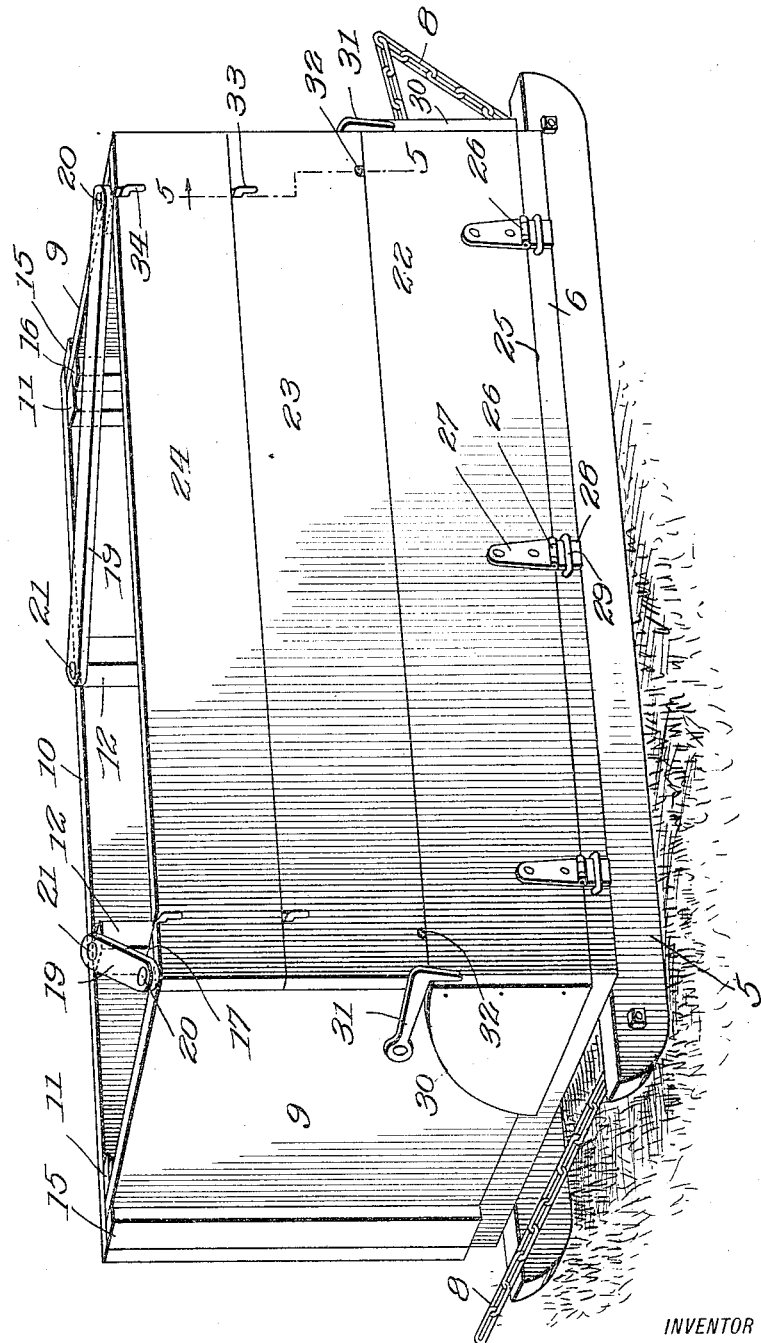

C. W. KIRBY.
GRAVE FILLING MACHINE.
APPLICATION FILED JULY 18, 1914.
1,123,891.
Patented Jan. 5, 1915.
2 SHEETS—SHEET 2.
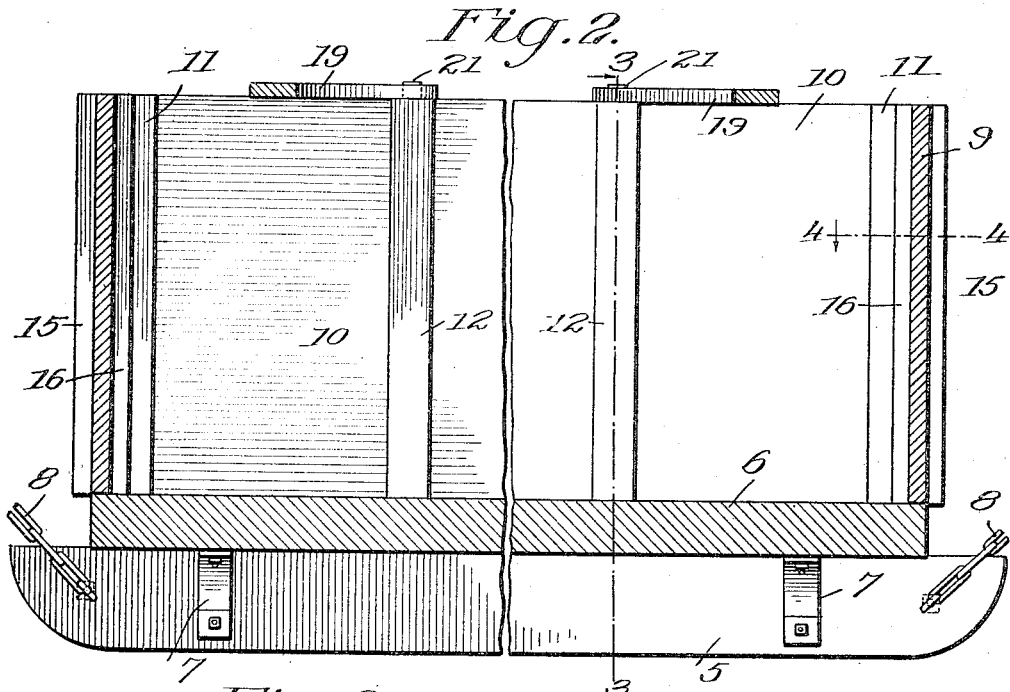
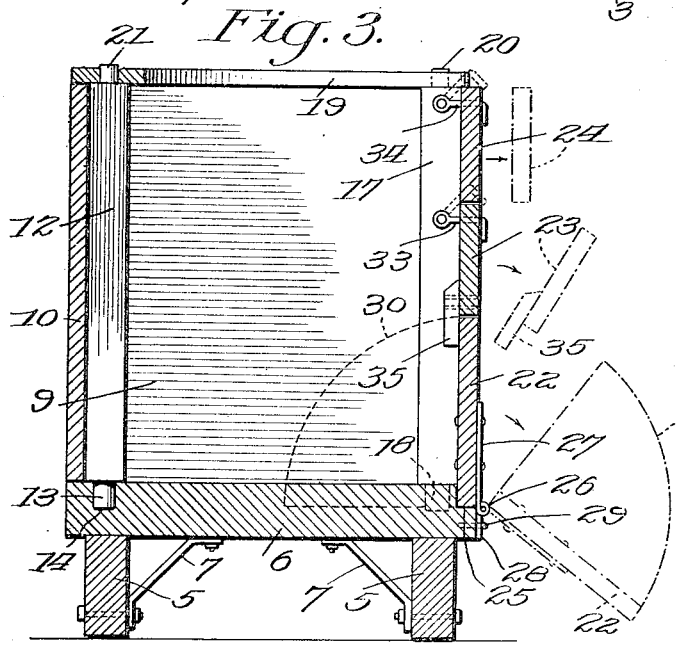
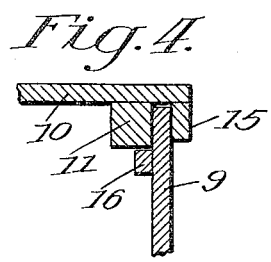
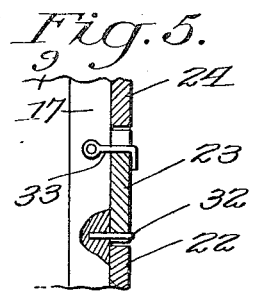
WITNESSES
Samuel E. Wade.
Alan F. Garner.
INVENTOR
Charles W. Kirby
BY Munn & Co.
ATTORNEYS

UNITED STATES PATENT OFFICE.

CHARLES WASHINGTON KIRBY, OF STRONGHURST, ILLINOIS.

GRAVE-FILLING MACHINE.

1,123,891. Specification of Letters Patent. Patented Jan. 5, 1915.

Application filed July 18, 1914. Serial No. 851,751.

*To all whom it may concern:*

Be it known that I, CHARLES W. KIRBY, a citizen of the United States, residing at Stronghurst, in the county of Henderson and State of Illinois, have invented a new and useful Improvement in Grave-Filling Machines, of which the following is a specification.

This invention relates to grave filling machines.

One of the principal objects of the invention is to provide a machine for receiving the earth during the process of making the excavation for a grave, the device being adapted to empty the earth into the excavation after the coffin has been lowered therein.

Another object of the invention is to provide a device of the class described incorporating a drag supporting a knock down box, the latter having a side gate or chute which may be tilted for emptying the device.

A further object of the invention is to provide a grave filling machine which will be simple, durable, efficient in operation and inexpensive to manufacture, and one which will require a minimum amount of shipping space.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a perspective view of a machine constructed according to my invention. Fig. 2 represents a vertical longitudinal sectional view through the same. Fig. 3 represents a vertical transverse sectional view through the same on the plane indicated by the line 3—3 of Fig. 2. Fig. 4 represents a fragmentary horizontal view taken on the plane indicated by the line 4—4 of Fig. 2. Fig. 5 represents a vertical fragmentary sectional view taken on the plane indicated by the line 5—5 of Fig. 1.

The drag on which the box is supported comprises a pair of runners 5 on which a floor 6 is supported. The ends of the runners extend beyond the ends of the floor, and are rounded as illustrated. Braces 7 are utilized for securing and bracing the floor and runners together. By means of the chains 8 secured to the runners at both ends of the machine, the latter may be drawn from place to place by means of draft animals or in any other desired manner.

The floor supports the body or box, adapted to receive the earth as the excavation is made. The end walls of the box are indicated at 9, and what may be termed the rear wall is indicated at 10. The latter is secured adjacent its ends to uprights 11. The latter form the rear corner posts of the box. Intermediate posts 11, at spaced intervals from them additional uprights 12 are provided. The latter like posts 11 are secured to the rear wall 10. The rear wall, like the end walls, is removably supported on floor 6. In order to secure the wall in place the uprights as indicated in Fig. 3 have their lower ends reduced as at 13 to fit in openings 14 provided in floor 6 near the rear edge thereof.

The end walls abut at their rear edges against wall 10. In order to maintain the rear edges of the end walls in position, guides are provided on wall 10 and these guides include strips 15 secured to the rear wall at the ends thereof in vertical position and in spaced relation to the corner uprights 11. The edges of the end walls are adapted to be positioned between the strips and the adjacent uprights. For further bracing and guiding the rear edges of end walls 9, the latter on their inner sides are provided with strips or uprights 16 adapted to engage against corner uprights 11. To the inner sides of the front edges of end walls 9 are secured front corner posts 17. The latter like the rear posts are provided with reduced lower ends 18 adapted to fit in openings in floor 6 near the front edge of the latter. The end walls are braced to the rear wall by means of braces 19. The latter are disposed diagonally of the box and at their ends are provided with openings for removably fitting over the upper reduced ends 20 and 21 of the front corner posts 17 and the rear posts 12 respectively, as clearly indicated in Fig. 1. From the foregoing it will be understood that the end walls and rear wall may be readily removed from floor 6, and that the end walls may be separated or removed from the rear wall.

The front wall is composed of segments including the gate or chute 22, and the middle and upper sections 23 and 24. The gate rests at its lower edge in the rabbeted upper front edge 25 of floor 6. The gate is provided with hinges 26 whose upper leaves 27 are secured to the gate, and whose lower leaves 28 removably engage in staples 29 secured to the front edge of floor 6. The ends of gate 22 are provided with inwardly extending segments 30 which engage the outer faces of ends walls 9, when the gate is in closed position. The segments are adapted to guide the earth in its movement from the box during the process of emptying the latter. The hooks 31 swiveled to end walls 9 are adapted to engage the segment in the manner indicated in Fig. 1 for maintaining the gate in closed position. The segments 23 and 24 are adapted to be removably maintained above the gate. Segment 23 is supported by pins 32 extending forwardly from the front corner posts 17, the lower end of the segment being recessed to fit the pins. In this manner the segment will be prevented from falling when the gate 22 is swung outwardly. The segment 24 is adapted to rest upon segment 23, and these two segments are maintained in engagement with the front corner posts by means of the sets of hooks 33 and 34 swiveled to said corner post, and adapted to engage the upper edges of the segments through recesses cut therein as indicated in Fig. 5. The segment 23 is provided on its inner surface with cleats 35 adapted to engage the inner surface of gate 22. The cleats and hooks 33 prevent lateral movement of segment 23, and the hooks 34 are sufficient to prevent lateral movement of segment 24 since lateral pressure on the latter is not great.

In operation the machine is first drawn to the place where the grave is to be dug and the segments 23 and 24 removed. The box is then filled to the level of gate 22, which is maintained in position by the hooks 31. Segment 23 is then placed in position and the box further filled and if necessary the segment 24 is then put in position and the filling process continued until the excavation is of the size required. The drag may then be drawn from the excavation to allow room for the participants in the burial ceremonies. After the coffin has been lowered in its place the drag may be brought back and placed alongside the excavation and the hooks 31 may be lifted. This will allow the gate 22 to swing outwardly as indicated in Fig. 3 so as to allow the earth to be emptied into the grave.

By reason of the knock down construction of the device the latter may be packed into a very small space for shipment.

Although I have described the preferred embodiment of my invention, I may desire to make such changes in the construction, combination and arrangement of parts thereof as do not depart from the spirit of the invention and the scope of the appended claims.

I claim:—

1. A grave filling machine comprising a pair of runners, a platform supported thereon, a rear and end walls supported on the platform, and a front wall, rear corner uprights carried by the rear wall, intermediate uprights carried thereby, all of said uprights adapted to detachably engage openings in the platform, said end walls adapted to abut at their rear edges against the rear wall, guide strips carried by the rear wall and adapted to co-act with the corner uprights in guiding the rear edges of the end walls, strips carried by the end walls and co-acting with the corner uprights for bracing and guiding the end walls, front corner uprights carried by the end walls and adapted to engage in openings in the platform, a front wall, said front wall comprising a lower and a plurality of upper sections, said lower section adapted to form a gate, and means for supporting the upper sections on the end walls independently of the gate.

2. A grave filling machine comprising a pair of runners, a platform supported thereon, a rear wall detachably supported upon the platform, end walls detachably supported on the platform, co-acting guides and braces provided on the end and rear walls, a sectional front wall including a gate and a plurality of sections, means for detachably supporting the sections on the end walls independently of the gate, and braces detachably connecting the end walls and rear wall.

CHARLES WASHINGTON KIRBY.

Witnesses:
THOMAS MORGAN,
WALDO JOHNSON.

Copies of this patent may be obtained for five cents each, by addressing the "Commissioner of Patents, Washington, D. C."